INVENTOR.
FREDERICK M. POTTER
BY
ATTORNEY

INVENTOR.
FREDERICK M. POTTER 3,258,621
CIRCUMFERENTIAL OIL RESERVOIR AND WICK MEANS FOR A MULTI-POSITION MOTOR
Frederick Milton Potter, Little Silver, N.J., assignor to The Bendix Corporation, Eatontown, N.J., a corporation of Delaware
Filed Oct. 18, 1963, Ser. No. 317,332
4 Claims. (Cl. 310—90)

The present invention relates to dynamoelectric machines and more particularly to means for lubricating the bearing for such machines.

Lubrication of the bearings in dynamoelectric machines, such, for example, as an aircraft generator, has presented a problem, especially the lubrication of the bearing located on the drive end of the machine. In the past, various types of grease have been used. It is necessary for proper lubrication to replenish the grease at frequent intervals which means removal of the machine from the aircraft and disassembly in order to reach the bearings.

The present invention provides a system in which the bearings are lubricated by oil from a reservoir by means of a wick thus enabling the lubricant to be replenished without removal or disassembly of the machine.

It is an object of the invention to provide an improved dynamoelectric machine.

Another object of the invention is to provide improved means for lubricating the bearings of a dynamoelectric machine.

Another object of the invention is to provide novel oil lubrication for a generator.

The above and other objects and features of the invention will appear more fully hereinafter from a consideration of the following description taken in connection with the accompanying drawing wherein one embodiment is illustrated by way of example.

Figure 1:
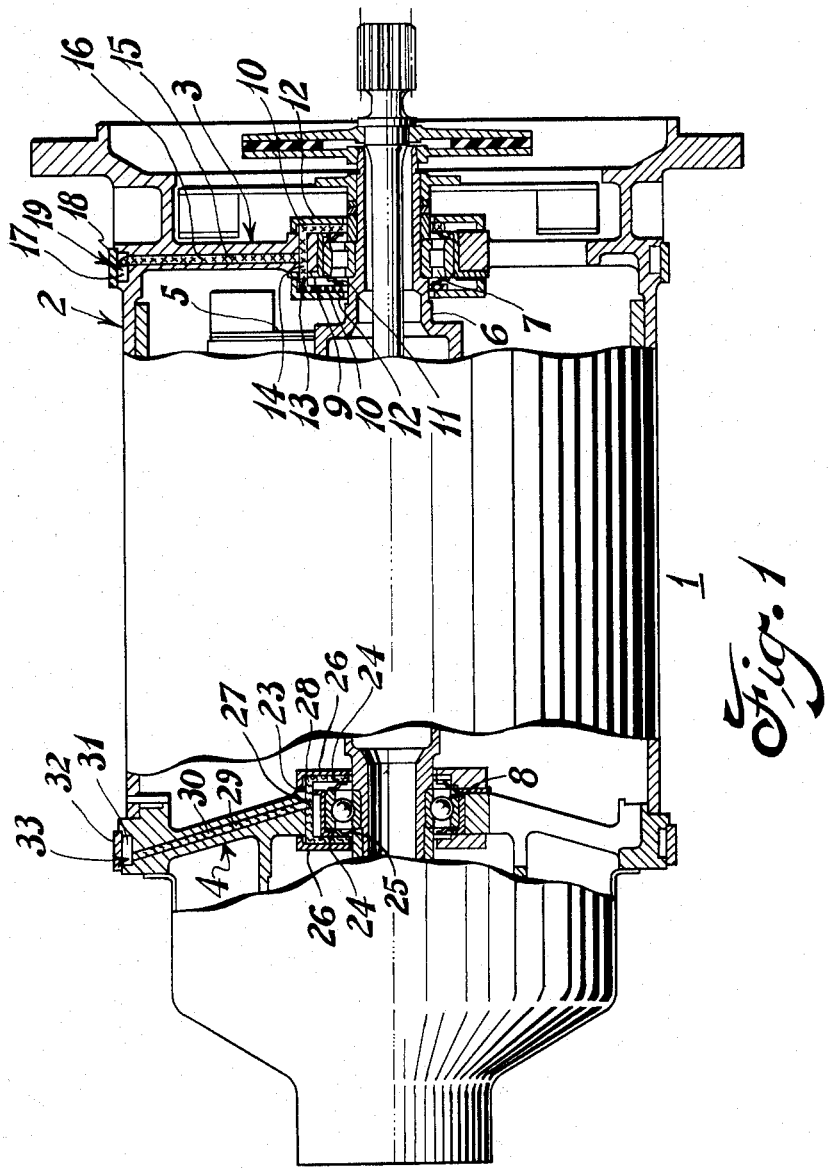
FIGURE 1 is a partial sectional view of a dynamoelectric machine illustrating one embodiment of the invention.
Figure 2:
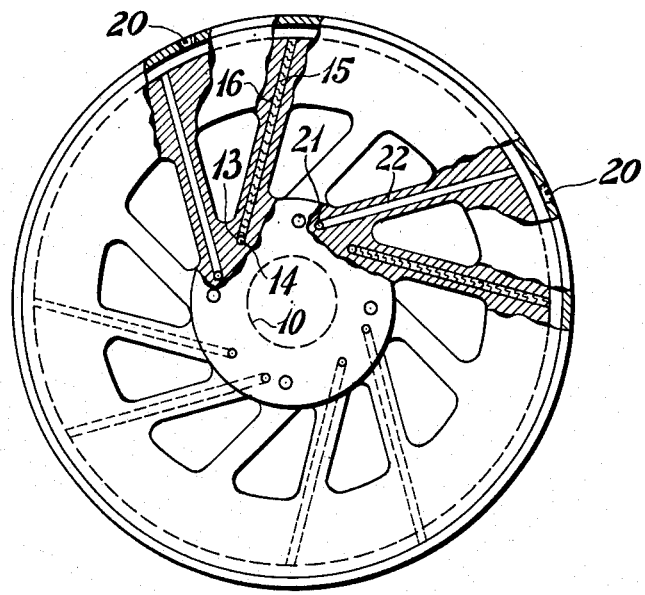
FIGURES 2 and 3 are partial end-views of the machine of FIGURE 1.
Figure 3:
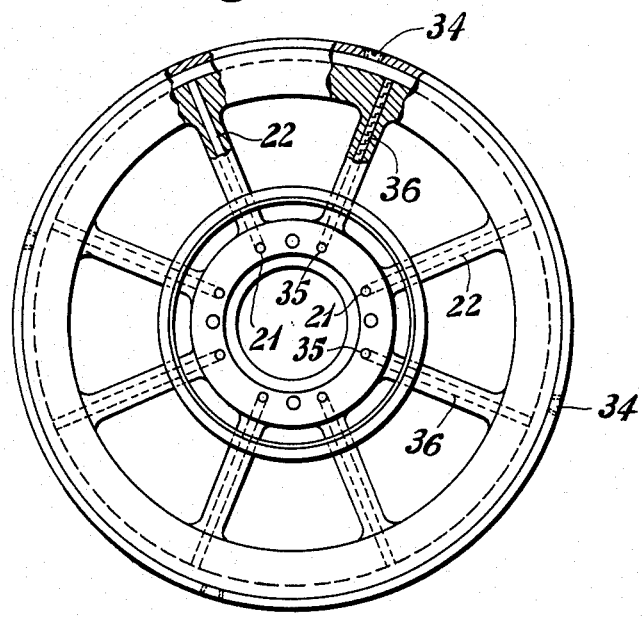

Referring now to the drawing, a dynamoelectric machine is indicated generally by the numeral 1 and for purposes of illustration may be an aircraft generator. Only a portion of the machine 1 has been illustrated and described in detail, the remainder has been omitted for simplicity. The machine 1 has a housing 2 which includes end bells or spiders 3 and 4. An armature 5, carried by a shaft 6, is rotatably mounted by bearings 7 and 8 in the respective end bells 3 and 4.

The bearing 7, illustrated as a roller bearing, is fitted on the shaft 6 and secured in the end bell 3 by a bearing liner 9. Felt washers 10 are retained between bearing retaining cap 11 of the bearing 7 and the clamp plates 12. The washers 10, which may be wool felt, a felt made of Teflon or other suitable material, have an inner diameter such as to make light contact with the shaft 6. The washers 10 are in intimate contact with cross plugs 13 of felt which are positioned in axial bores 14 through end bell 3. The bores 14 connect with radial bores 15 in the end bells 3 in which a felt wick 16 is positioned. The other end of the radial bores 15 connect with a circumferential channel 17 in the end bell 3. A band 18 is fitted around the channel 17 thereby to form an annulus type oil reservoir 19. Filler plugs 20 may be located around the perimeter of the band 18. The reservoir would normally be filled to approximately the bottom of the bearing as the generator 1 is in a horizontal position. In addition to the bores 14 and 15, axial bores 21 and connecting radial bores 22 are provided without wicks to permit any excess oil to drain from the bearing 7 back into the reservoir 19.

In like manner, the bearing 8, which is illustrated as a ball bearing, is mounted in the end bell 4 by means of a bearing liner 23. Felt washers 24, of a material similar to that previously described for washers 10, are retained between bearing retaining cap 25 and clamp plates 26. The washers 24 are in intimate contact with cross plugs 27 which are of a material similar to that of the washers 24 and are positioned in axial bores 28 in the end bell 4. The bores 28 connect with radial bores 29 in which felt wicks 30 are positioned. The wicks 30 have one end thereof in contact with the plugs 27 and the other end extends through the bore 29 into a circumferential channel 31 in the end bell 4. A band 32 is provided to enclose the channel 31 to form an annulus type reservoir 33. A plurality of filler plugs 34 may be provided in the band 31 for putting oil in the reservoir 33. In order to drain excessive oil from the bearings, axial bores 35 and connecting radial bores 36 are provided in the end bell 4.

In the embodiment illustrated, the radial bores 15 and 29 are positioned in the respective end bells 3 and 4 at 90 degree intervals. With this arrangement, at least one each of the respective wicks 16 and 30, regardless of the attitude of the machine 1, will be dipping into oil. Also, by positioning the drain bores 22 and 36 alternately between the respective wicks 16 and 30, drainage will be assured at all times.

A further advantage of the aforenoted system is that a roller bearing can be utilized at the drive end of the machine to obtain a free floating construction. This is not feasible with the use of grease as the lubricant.

Although the embodiment illustrated utilizes four wicks and four drains for each bearing, it is understood that these numbers may be altered to suit conditions. For example, if the machine was fixed in one position, only one wick and one drain would be sufficient. However, it is known that when a generator is mounted in an aircraft that it will be in different attitudes during a flight, hence, the necessity for a plurality of wicks and drains to assure correct lubrication at all times.

Although only one embodiment of the invention has been illustrated and described, various changes in the form and relative arrangement of the parts, which will now appear to those skilled in the art, may be made without departing from the scope of the invention.

What is claimed is:

1. A dynamoelectric machine comprising a housing, a rotor, roller bearing means mounting said rotor in said housing, means including first wicks surrounding said bearings, circumferential channels in said housing and extending around and adjacent to the ends thereof, a plurality of radial bores extending from said channels to said means surrounding said bearings, second wick means in alternate ones of said radial bores, and a lubricant in said channels whereby said bearing is lubricated by means of said wicks.

2. Lubricating means for a dynamoelectric machine having a housing and a rotor, comprising a circumferential oil reservoir surrounding and adjacent to the ends of said machine, bearings having an inner cage rotatable to an outer cage supporting said rotor in said housing, a plurality of passageways extending from said reservoirs to said bearings, and wick means positioned in said passageways for carrying oil from said reservoir to said bearings.

3. A dynamoelectric machine having a housing and a motor, the improvement comprising an end bell in said housing having a ball bearing supported therein rotatably mounting said rotor in said housing, clamping means including oil seals for mounting said bearing in said end bell, a circumferential channel extending around the circumference of said end bell, a plurality of axial channels in said end bell adjacent to said bearing, a plurality of radial channels extending in said end bells from said circumferential channel to said axial channels, wick means positioned between said bearing, other wick means extending from said circumferential channel through said radial and axial channels to said first said wick means, and cover means for said circumferential channel to form an oil reservoir.

4. The combination as set forth in claim 3 and including additional radial and axial channels in said end bells to return excess oil from said bearing to said oil reservoir.

References Cited by the Examiner
UNITED STATES PATENTS

| | | | |
|---|---|---|---|
| 552,961 | 1/1896 | Jackson | 310—90 |
| 982,165 | 1/1911 | Whitney | 310—90 |
| 1,341,415 | 5/1920 | Conklin | 310—90 |
| 2,245,433 | 6/1941 | Delmonte | 310—90 |
| 2,814,747 | 11/1957 | Momberg | 310—90 |
| 2,945,729 | 7/1960 | Mitchell | 310—90 |
| 3,210,581 | 10/1965 | Jakel | 310—90 |

MILTON O. HIRSHFIELD, *Primary Examiner.*

ORIS L. RADER, *Examiner.*

J. W. GIBBS, *Assistant Examiner.*